(12) United States Patent  (10) Patent No.: US 9,092,291 B1
Adib et al.  (45) Date of Patent: Jul. 28, 2015

(54) DYNAMIC UPDATING AND RENAMING VIRTUAL PRE-INSTALLATION STUB APPLICATIONS

(71) Applicant: Sprint Communications Company L.P., Overland Park, KS (US)

(72) Inventors: Fared A. Adib, Overland Park, KS (US); Robert H. Burcham, Overland Park, KS (US); Jason R. Delker, Olathe, KS (US); Jason Salge, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/940,253

(22) Filed: Jul. 11, 2013

(51) Int. Cl.
  *G06F 9/44* (2006.01)
  *G06F 9/445* (2006.01)
(52) U.S. Cl.
  CPC .................................. *G06F 8/61* (2013.01)
(58) Field of Classification Search
  CPC ............... G06F 7/78; G06F 8/00–8/78; G06F 9/44–9/455; G06F 11/36
  USPC .................................................. 717/100–178
  See application file for complete search history.

(56) References Cited

U.S. PATENT DOCUMENTS

| 8,577,737 | B1* | 11/2013 | Amacker et al. | 705/26.1 |
| 2004/0148598 | A1* | 7/2004 | Kita et al. | 717/170 |
| 2006/0168340 | A1 | 7/2006 | Heller et al. | |
| 2007/0143740 | A1* | 6/2007 | Hoerentrup et al. | 717/120 |
| 2009/0064055 | A1* | 3/2009 | Chaudhri et al. | 715/863 |
| 2009/0199176 | A1 | 8/2009 | Nath et al. | |
| 2012/0272178 | A1* | 10/2012 | Oygard et al. | 715/781 |

OTHER PUBLICATIONS

Mehrotra et al., SenSocial: A Middleware for Integrating Online Social Networks and Mobile Sensing Data Streams.*
FAIPP Pre-Interview Communication dated Aug. 25, 2014, U.S. Appl. No. 13/940,251, filed Jul. 11, 2013.
First Action Interview Office Action dated Oct. 17, 2014, U.S. Appl. No. 13/940,251, filed Jul. 11, 2013.
Adib, Fared A., et al., "Virtual Pre-Installation of Applications," filed Jul. 11, 2013, U.S. Appl. No. 13/940,251.
Notice of Allowance dated Mar. 9, 2015, U.S. Appl. No. 13/940,251, filed on Jul. 11, 2013.

(Continued)

*Primary Examiner* — Wei Zhen
*Assistant Examiner* — Zhan Chen

(57) ABSTRACT

A method of renaming stub applications on a mobile communication device comprises installing a plurality of stub applications, wherein each of the stub applications comprises a generic file name. The method further comprises determining a plurality of interactive thumbnail images to present on a display, wherein the determining is done by a widget, displaying the plurality of interactive thumbnail images within a graphical user interface frame of the widget in response to the determining, wherein each of the interactive thumbnail images is linked to one of the stub applications, identifying that the generic file names of the stub applications do not match the file names of the interactive thumbnail images to which they are linked, and replacing the generic file names of the stub applications linked to the interactive thumbnail images with file names that match the file names of the interactive thumbnail images in response to the identifying.

20 Claims, 10 Drawing Sheets

(56) References Cited

OTHER PUBLICATIONS

Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

Delker, Jason R., et al. "Network Access Tiered Based on Application Launcher Installation," filed Mar. 4, 2015, U.S. Appl. No. 14/639,060.

* cited by examiner

DYNAMIC UPDATING AND RENAMING VIRTUAL PRE-INSTALLATION STUB APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as mobile phones and smart phones may be capable of running a plurality of software applications. Software applications include social media applications, weather applications, sports applications, gaming applications, map applications, and a wide variety of other applications. Executing software applications may provide a user of the mobile communication device with functionality that would be otherwise unavailable or inconvenient on the mobile communication device. For example, the user may find it convenient to use a software application to directly access a social media site rather than accessing the social media site manually by searching the internet. Software applications may be installed at the time of manufacture or by the user of the mobile communication device.

SUMMARY

In an embodiment, a method of renaming stub applications on a mobile communication device is disclosed. The method comprises installing, on the mobile communication device, a plurality of stub applications, wherein each of the stub applications comprises a generic file name configured to allow the stub application to be matched to an interactive thumbnail image by replacing the generic file name with a file name that matches the interactive thumbnail image and determining a plurality of interactive thumbnail images to present on a display of the mobile communication device, wherein the determining is done by a widget on the mobile communication device. The method further comprises displaying the plurality of interactive thumbnail images within a graphical user interface frame of the widget in response to the determining, wherein each of the interactive thumbnail images is linked to one of the stub applications, identifying that the generic file names of the stub applications do not match the file names of the interactive thumbnail images to which they are linked, and replacing the generic file names of the stub applications linked to the interactive thumbnail images within the graphical user interface frame of the widget with file names that match the file names of the interactive thumbnail images to which they are linked in response to the identifying.

In an embodiment, a mobile communication device is disclosed. The mobile communication device comprises a processor, a memory, a plurality of stub applications stored in the memory, wherein each of the stub applications comprises a generic file name, and a widget stored in the memory that, when executed by the processor, configures the processor to present, on a display of the mobile communication device, a plurality of interactive thumbnail images each of which is linked to one of the stub applications. The mobile communication device further comprises a daemon application configured to compare the file names of the interactive thumbnail images with the file names of the stub applications to which they are linked and rename stub applications that comprise file names that do not match the file names of the interactive thumbnail images to which they are linked.

In an embodiment, a method of renaming stub applications on a mobile communication device is disclosed. The method comprises determining a plurality of interactive thumbnail images to present on a display of the mobile communication device, wherein the determining is done by a widget on the mobile communication device and identifying, in a stub application repository, a plurality of stub applications to be linked to the plurality of interactive thumbnail images each comprising an outdated version number and a file name that matches the file name of the interactive thumbnail image to which it is to be linked. The method further comprises installing, on the mobile communication device, the plurality of stub applications identified in the stub application repository and displaying the plurality of interactive thumbnail images within a frame of the widget in response to the determining, wherein each of the interactive thumbnail images is linked to one of the stub applications.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
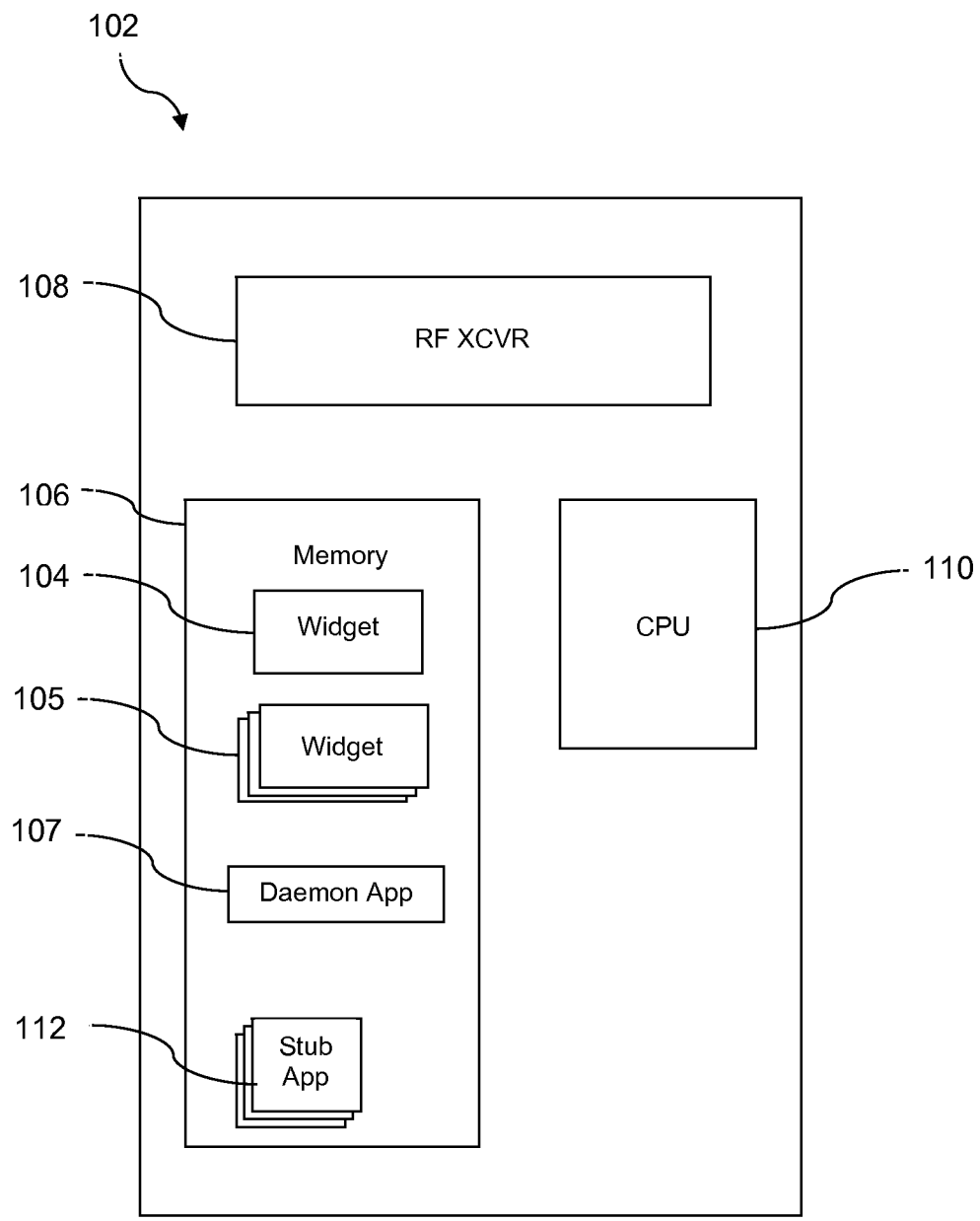
FIG. 1 is a block diagram of a mobile communication device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, dynamically presenting virtually preinstalled full applications on a mobile communication device by renaming stub applications that comprise generic file names to match file names associated with interactive thumbnail images representing virtually preinstalled full applications is described. Applications such as social media applications, weather applications, sports applications, gaming applications, and/or other applications are frequently installed on mobile communication devices such as mobile phones or smart phones. Installed applications may provide a mobile communication device with functionalities that would be otherwise unavailable and may allow a user of the mobile communication device to access functionalities directly without performing a manual search. For example, the user may use a weather application to quickly view a local forecast rather than manually searching the internet for the local forecast. Applications may be installed by the user or preinstalled at the time of manufacture.

The user may be more likely to use a given application if it is preinstalled on the mobile communication device. This may be because the user finds it inconvenient to install applications on the mobile communication device, it may be because the user would not have had knowledge of the application if it were not preinstalled on the mobile communication device, it may be because preinstalled applications may be more visible to the user, or it may be because of some other reason. Application providers seeking to increase consumer use of their applications may desire to have their applications preinstalled on mobile communication devices. It is known that running applications on a mobile communication device has an associated overhead cost e.g., reduced battery life, reduced active memory, reduced storage space, etc. While application providers may want their applications to be preinstalled, mobile communication device users may wish to reduce overhead costs associated with applications by limiting installation of undesired applications.

Full applications may be virtually preinstalled by preinstalling limited functionality, updateable stub applications in place of corresponding full applications. In an embodiment, the stub applications may be called by interactive thumbnail images in a widget of a mobile communication device. The widget may provide access to an application repository such that, in response to selecting the interactive thumbnail image, a full application corresponding to the stub application represented by the interactive thumbnail image may be downloaded to replace the stub application. In an embodiment, the stub application may comprise a limited version of the full application in which installation permissions are satisfied such that the stub application may be updated to the full application.

The present disclosure teaches dynamically presenting virtually preinstalled full applications. In some contexts, presenting virtually preinstalled full applications may be considered to be substantially similar to displaying virtually preinstalled full applications. The virtually preinstalled full applications displayed on the mobile communication device may be determined by reading an updateable file and/or information feed, wherein changes in the updateable file and/or information feed may result in changes in which of the virtually preinstalled full applications are displayed. Virtually preinstalled full applications that are selected to be displayed on the mobile communication device may be represented by interactive thumbnail images linked to stub applications.

The interactive thumbnail images to be displayed on the mobile communication device may be pulled down and/or downloaded from locations specified in the updateable file and/or information feed and may be paired and/or linked to stub applications. The stub applications may be installed with generic file names such that they may be renamed to match the file names of the interactive thumbnail images to which they are linked, wherein the interactive thumbnail images may comprise file names that match the virtually preinstalled full applications they represent. A stub application that comprises a file name that matches an interactive thumbnail image representing a virtually preinstalled full application may be said to correspond to the full application that is virtually preinstalled.

The interactive thumbnail images displayed in the widget of the mobile communication device may be updated to represent different virtually preinstalled full applications in response to a change in the updateable file and/or information feed. Interactive thumbnail images that represent virtually preinstalled full applications may comprise an image associated with the full application that is virtually preinstalled and may comprise a file name that matches the file name of the full application that is virtually preinstalled. The stub applications linked to those interactive thumbnail images may be renamed from their generic file names, or from file names matching the previous interactive thumbnail images to which they were linked, to match the file names of the interactive thumbnail images to which they are linked. Matching the file names of stub applications to the file names of the interactive thumbnail images to which they are linked may allow the stub applications to be updated to full applications as described above.

In an embodiment, the stub applications may be obtained from a stub application data store in response to a demand for virtually preinstalled full applications. For example, the updateable file and/or information feed may elicit a set of 8 virtually preinstalled full applications to be displayed on the mobile communication device. 8 stub applications corresponding to 8 full applications to be displayed as the set of 8 virtually preinstalled full applications may be obtained from the stub application data store in response to the demand for the set of 8 virtually preinstalled full applications.

Virtually preinstalled full applications may give application providers the chance to increase consumer use of their applications while reducing the potential drawbacks for the user. For example, it is expected that virtually preinstalled full applications, i.e. preinstalled stub applications in place of corresponding full applications, may have lower overhead costs than directly preinstalled full applications. For example, virtually preinstalled full applications may drain less battery life and/or take up less memory than directly preinstalled full applications. The user may choose to use some virtually preinstalled full applications but not others. In this case, the user may direct the mobile communication device to update from the stub applications of desired full applications to the desired full applications while leaving the stub applications of undesired full applications as stub applications. Leaving the stub applications of undesired full applications as stub applications may reduce overhead as described above. By implementing virtually preinstalled full applications, it is expected that the user may derive benefits associated with preinstalled applications, such as convenience and exposure to new applications, while reducing drawbacks associated with preinstalled applications such as reduction of battery life and/or reduced memory space caused by unused preinstalled applications. For more details on virtual pre-installation, see U.S. patent application Ser. No. 13/940,251, filed Jul. 11, 2013, entitled "Virtual Pre-Installation of Applications," by Fared A. Adib, et al., which is hereby incorporated by reference in its entirety.

Dynamic presentation of virtually preinstalled full applications may allow the presentation of virtually preinstalled full applications to be responsive to user preference, public preference, market conditions, availability of applications, business relations, and/or other conditions. For example, a virtually preinstalled gaming application on a mobile communication device may be readily changed out for a different virtually preinstalled full application in response to the gaming application provider going out of business.

Turning now to FIG. 1, a mobile communication device 102 is described. In an embodiment, the mobile communication device 102 comprises a radio frequency transceiver (RF XCVR) 108, a processor 110, and a memory 106. In an embodiment, the memory 106 comprises a virtual installation widget 104, a plurality of widgets 105, a daemon application 107, and a plurality of stub applications 112. The mobile communication device 102 may comprise a mobile phone, a smart phone, a personal digital assistant, a media player, a laptop computer, a notebook computer, or other mobile communication device. The plurality of widgets 105 may comprise widgets such as a checkbox, a slider, a menu, a clock, a calendar, a weather forecast, the virtual installation widget 104, other widgets, or combinations thereof. In an embodiment, the components of the mobile communication device 102 described hereinabove may be provided at the time of manufacture.

The memory 106 may comprise a set number of stub applications 112. For example, the memory 106 may comprise about 4 stub applications 112, about 6 stub applications 112, about 8 stub applications 112, about 10 stub applications 112, about 12 stub applications 112, about 14 stub applications 112, about 16 stub applications 112, about 30 stub applications 112, about 50 stub applications 112, about 100 stub applications 112, about 300 stub applications 112, about 500 stub applications 112, or some other number of stub applications 112.

In an embodiment, the plurality of stub applications 112 may comprise stub applications 112 that are limited functionality versions of full applications, wherein limited functionality versions may provide less functionality than full applications and may be smaller than full applications. For example, in some cases, the stub applications 112 may comprise only a file name and a version number. The file name may correspond to the full application that corresponds to the stub application 112. The plurality of stub applications 112 may be installed with outdated version numbers such that a prompt to update to a newer version may be displayed in response to selection of one of the stub applications 112. The stub applications 112 may be installed at the time of manufacture with installation permissions already granted thus allowing the stub applications 112 to be updated to fully functioning full applications in response to update instructions without satisfying further permissions.

Each of the stub applications 112 may comprise a link to its corresponding full application, wherein the link may be configured to allow the full application to be downloaded to replace the stub application 112. In an embodiment, each of the stub applications 112 may be represented by an interactive thumbnail image within a frame of the virtual installation widget 104. Selection of one of the interactive thumbnail images may call the stub application 112 represented by the interactive thumbnail image. When the stub application 112 is called, its version number may be checked, and an update request may be displayed to a user of the mobile communication device 102 in response to identifying that the version number of the stub application 112 is out of date. The stub application 112 may be updated to its corresponding full application in response to the user granting permission to perform the update. In some cases, granting permission to perform the update may be considered to be update instructions.

In an embodiment the plurality of stub applications 112 may be installed with generic file names that do not yet correspond to full applications. Interactive thumbnail images representing virtually preinstalled full applications may be displayed in the virtual installation widget 104 and may be linked to the stub applications 112. Interactive thumbnail images representing virtually preinstalled full applications may comprise an image and a file name associated with the full application that is virtually preinstalled. The daemon application 107 may be configured to compare the file names of the interactive thumbnail images displayed in the virtual installation widget 104 with the stub applications 112 to which they are linked. If the file names of the stub applications 112 do not match the file names of the interactive thumbnail images to which they are linked, then the daemon application 107 may rename the stub applications 112 to match the file names of the interactive thumbnail images to which they are linked. Stub applications 112 with file names that match the file names of the interactive thumbnail images to which they are linked may be said to correspond to full applications represented by the interactive thumbnail images and may be updated to full applications as described above.

In an embodiment, the interactive thumbnail images may link to a single stub application 112 which may be invoked in response to selection of one of the interactive thumbnail images. Invoking the single pull stub application 112 by selecting an interactive thumbnail image may fulfill a parameter that allows an application package corresponding to the selected interactive thumbnail image to be installed. In some cases, the single stub application 112 may be updated to a full application corresponding to the selected interactive thumbnail image and may be replaced by another single stub application 112. Alternatively, the single stub application 112 may remain unchanged and a full application corresponding to the selected interactive thumbnail image may be installed without altering the single stub application 112. The interactive thumbnail image that was selected whose full application has been installed may be removed from the virtual installation widget 104 as described above.

Preinstalling the stub applications 112 in place of corresponding full applications such that the stub applications 112 may be updated to and/or otherwise replaced by their corresponding full applications in response to update instructions may be referred to as virtually preinstalling the full applications, virtually preinstalling applications, virtual preinstallation, virtually installing applications, virtual installation, or such installing may be referred to as another term.

Figure 2:
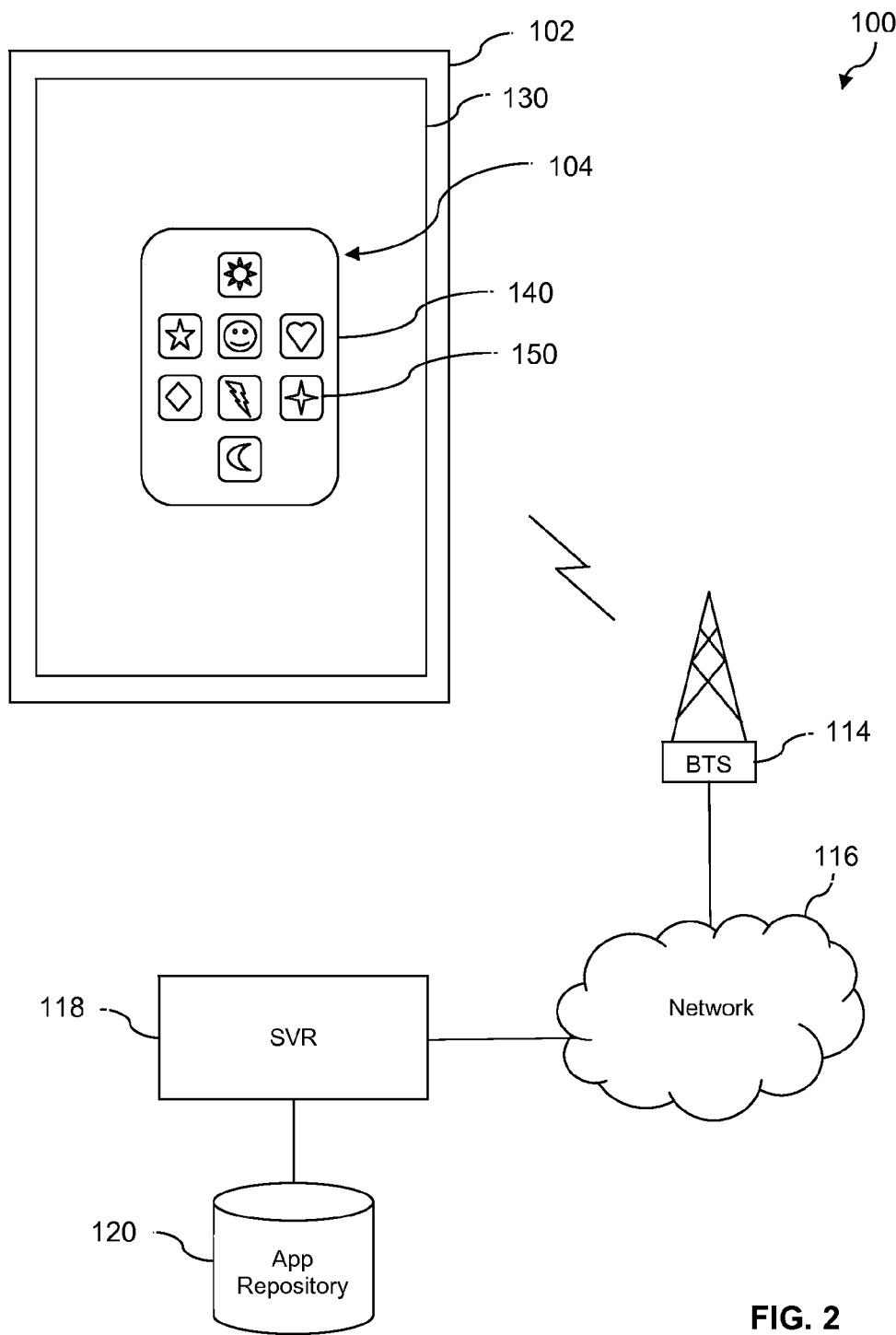
FIG. 2 is a diagram of a communication system according to an embodiment of the disclosure.

Turning now to FIG. 2, a communication system 100 is described. In an embodiment, the communication system 100 comprises the mobile communication device 102, a base transceiver station (BTS) 114, a network 116, a server 118, and an application repository 120. In an embodiment, the application repository 120 may be an online application store, a service provider application store, or some other location at which applications are stored. The mobile communication device 102 is depicted as comprising a display 130 and the virtual installation widget 104. The virtual installation widget 104 is depicted as comprising a frame 140 and a plurality of interactive thumbnail images 150.

While the mobile communication device 102 is depicted as comprising the display 130 and the virtual installation widget 104, it should be understood that the mobile communication device 102 may further comprise one or more speakers, a user interface, an antenna, a graphical user interface, one or more input/output ports, a camera, one or more buttons, one or more other features on the display 130, other components, or combinations thereof. Though the communication system 100 is shown as comprising a singular base transceiver station 114 and a singular network 116, it is contemplated that the communication system 100 may comprise a plurality of base transceiver stations 114 and/or a plurality of networks 116. The interactive thumbnail images 150 are depicted as comprising a variety of common images. These images are not meant to limit the scope of the present disclosure; rather, they are representative of a wide range of images that the interactive thumbnail images 150 may comprise.

The virtual installation widget 104 is depicted on the display 130 of the mobile communication device 102. In an embodiment, the virtual installation widget 104 may be presented on a home screen of the display 130 upon power up, at regular time intervals, and/or constantly. The plurality of stub applications 112 may be represented by the interactive thumbnail images 150 within the frame 140 of the virtual installation widget 104. Each stub application 112 may correspond to a full application stored in the application repository 120 and may be represented by one of the interactive thumbnail images 150. It should be understood that describing actions as being performed by the virtual installation widget 104 may be alternatively described as the virtual installation widget 104 configuring the processor 110 to perform those actions.

In an embodiment, the interactive thumbnail image 150 for a given stub application 112 may comprise a logo associated with the stub application 112 or with a full application corresponding to the stub application 112. For example, the stub application 112 of a full application for a social media site may be represented by an interactive thumbnail image 150 of a logo for the social media site. The plurality of different stub applications 112 may be represented by a plurality of interactive thumbnail images 150 each displaying a different image corresponding to the stub application 112 that it represents. For example, FIG. 2 depicts a plurality of different images displayed by the plurality of interactive thumbnail images 150.

In an embodiment, each of these different images may represent a different stub application 112 within the frame 140 of the virtual installation widget 104. In some cases, the interactive thumbnail images 150 within the frame 140 of the virtual installation widget 104 may represent a limited set of the stub applications 112. For example, there may be 50 stub applications 112 stored in the memory 106 of the mobile communication device 102, and 8 stub applications 112 may be represented by interactive thumbnail images 150 in the frame 140 of the virtual installation widget 104.

In some contexts, representing the stub application 112 and representing its corresponding full application may be considered to be substantially similar, i.e., the interactive thumbnail image 150 for the stub application 112 and its corresponding full application may comprise the same image in some cases. Accordingly, it is contemplated that a user may be unable to tell the difference between virtually preinstalled full applications and directly preinstalled full applications. In addition to logos, the interactive thumbnail image 150 for stub applications 112 may further comprise user selected images, textual images, photographs, nature scenes, symbols, common images, animated images, cartoon images, colors, brand names, trademarks, another image configured to allow a user of the mobile communication device 102 to identify virtually preinstalled full applications, or combinations thereof.

In an embodiment, the interactive thumbnail images 150 and/or the stub applications 112 presented in the frame 140 of the virtual installation widget 104 on the display 130 of the mobile communication device 102 may be determined by the virtual installation widget 104. The virtual installation widget 104 may select a predetermined number of stub applications 112 to be represented from the memory 106, from a stub application repository stored on the network 116, from another location, or from combinations thereof. The predetermined number of stub applications 112 to be represented may be about 4, about 6, about 8, about 10, about 12, about 14, about 16, or some other number. Alternatively, the stub applications 112 presented in the frame 140 of the virtual installation widget 104 on the display 130 of the mobile communication device 102 may be determined on the network side.

In an embodiment, the virtual installation widget 104 may determine the stub applications 112 to present based on reading an Extensible Markup Language (XML) file or a Rich Site Summary (RSS) feed. The XML file or RSS feed may be altered by a service provider to change the stub applications 112 that are presented. The service provider may wish to change the stub applications 112 presented in the virtual installation widget 104 because the full applications that are represented by the stub applications 112 may no longer exist, an application provider may have gone out of business, an application provider may be unable to support a virtual installation of its full application on the mobile communication device 102, or for another reason. In an embodiment, the stub application 112 represented in the virtual installation widget 104 may be changed to a different stub application 112 because the represented stub application 112 may have lost favor, ranking, prestige, rating, or been devalued such that an application provider may wish the different stub application 112 to be represented in the virtual installation widget 104. In another case, an application provider may cease to pay for the stub application 112 to be represented in the virtual installation widget 104. The stub application 112 may be removed from the virtual installation widget 104 and from a list of available virtual applications in response to the cessation of payment.

In an embodiment, the virtual installation widget 104 may read the XML file or RSS feed and display a plurality of the interactive thumbnail images 150 in response to information contained in the XML file or RSS feed. The plurality of interactive thumbnail images 150 that are displayed may comprise file names that match full applications and may be linked to generically named stub applications 112. In some contexts, displaying interactive thumbnail images 150 in response to information contained in the XML file or RSS feed may be referred to as determining stub applications 112 to present and/or represent, determining full applications to present and/or represent, determining virtually preinstalled applications to present and/or represent, or it may be referred to as something else.

The daemon application 107 may be configured to compare the file names of displayed interactive thumbnail images 150 with stub applications 112 to which they are linked. The daemon application 107 may perform the comparison at predetermined time intervals such as every hour, every 6 hours, every day, every week, at some other time interval, or the daemon application 107 may constantly check for discrepancies between displayed interactive thumbnail images 150 and the stub applications 112 to which they are linked. Alternatively, the daemon application 107 may perform the comparison in response to a trigger such as changing the displayed interactive thumbnail images 150. The daemon application 107 may identify that the generic file names of the stub applications 112 do not match the file names of the displayed interactive thumbnail images 150 to which they are linked. The daemon application 107 may rename the stub applications 112 with a file name and an outdated version number to match the file names of the displayed interactive thumbnail images to which they are linked.

In an embodiment, the virtual installation widget 104 may read the XML file or RSS feed and adjust the presented stub applications 112 at predetermined times and/or intervals such as upon boot up, every hour, every 6 hours, every 12 hours, once a day, once a week, at midnight, at noon, or at some other predetermined time and/or interval. Additionally, the virtual installation widget 104 may read the XML file or RSS feed in response to a trigger, wherein the trigger may comprise directions from a server, directions from a user, removal of one of the stub applications 112 from the frame 140, or some other instructions.

Determining, based on the XML file or RSS feed, which stub applications 112 are presented in the frame 140 of the virtual installation widget 104 may allow the presentation of stub applications 112 to be dynamic in nature. Dynamic presentation of stub applications 112 may comprise the ability to change which stub applications 112 are presented in response to stimuli. In an embodiment, after the stub application 112 has been updated to and/or replaced by its corresponding full application, it may be removed from the frame 140 and replaced by a different stub application 112. For example, when a social media stub application 112 is updated to and/or replaced by its corresponding social media full application, the social media application in all forms may be removed from the frame 140 and replaced by a different stub application 112. Replacement stub applications 112 may be taken from the memory 106, from the stub application repository stored on the network 116, from another location, or from combinations thereof. Replacement stub applications 112 may already correspond to full applications. Alternatively, replacement stub applications 112 may comprise generic stub applications that may be renamed to correspond to full applications. Further, the stub applications 112 may be dynamically selected for presentation in the frame 140 according user preference, user selection, server selection, a predetermined rotation, or according to some other selection criteria.

In an embodiment, presentation of the stub applications 112 may be said to be dynamic when the stub applications 112 are presented according to categories selectable by a user of the mobile communication device 102. The virtual installation widget 104 may comprise a series of tabs that may allow the user to select virtually preinstalled full applications based on favorites, genres, personal lists, user preferences, user previous selections, a predetermined rotation, or according to some other selection criteria. In some embodiments, selection of one of the stub applications 112 may cause related stub applications 112 to be presented.

In an embodiment, the stub applications 112 that are represented by interactive thumbnail images 150 in the frame 140 may be determined by an interface and applications pack that is running on the mobile communication device 102. For example, the plurality of stub applications 112 represented in the frame 140 may comprise limited versions of gaming applications when a gaming interface and applications pack is active on the mobile communication device 102.

An interface and applications pack (IAP) comprises at least one of a media file, an application, a web widget, and a network service and may be used to customize the communication experience of using an electronic device. In an embodiment, the interface and applications pack comprises at least two of these enumerated elements. In another embodiment, the interface and applications pack comprises at least three of these enumerated elements. An interface and applications pack may be viewed as an aggregated set of applications, web widgets, network services, ring tones, ringback tones, alerting tones, wallpapers, interface controls, and other content targeted for the electronic device. In some contexts, the interface and applications pack may be referred to as an ID pack.

As an example, but not by way of limitation, an interface and applications pack may be produced by an enterprise such as a retail outlet or a media business to promote its business interests to wireless communication service subscribers. The interface and applications pack, when active on an electronic device, may provide a control to select a store mapping web widget that provides a map of the location of products within a retail store, where the map of the store is dynamically downloaded by the web widget based on a physical location of the electronic device and based on known locations of the retail stores operated by the enterprise. The map web widget may provide a control to select a search utility for finding the location of a specific product within a store.

The interface and applications pack may provide an application that automatically generates an electronic coupon and posts a notification about the coupon in a notifications display area of the electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The interface and applications pack may provide controls to select videos posted to the home improvement social media site, for example video showing fundamental techniques of using tools.

The interface and applications pack may provide media files that define wall papers and themes that change the look and sounds of the electronic device. For example, the interface and application pack may include an audio file that defines an aural alert associated with receiving a short message service (SMS) message that is the sound of hammering. For example, the interface and application pack may include a picture file that defines the background of the display of the electronic device to be a photographic view of picturesque mountains seen through a 2×4 frame structure for a storage shed. These examples are provided to suggest the scope and power of the ID pack construct, but it is understood that a great variety of implementations of the ID pack are contemplated by the present disclosure. The interface and applications pack may include alerting tones that are played when selected events occur to alert a user, for example to alert the user that a simple message service (SMS) message has been received or to alert the user to an event or the approach of an event germane to the subject interface and applications pack.

The interface and applications pack may provide interface controls for selecting functionality provided as part of the interface and applications pack as well as for selecting functionality that may be provided by the electronic device independently of the interface and applications pack. For example, the interface and applications pack may provide a control for invoking an address book widget that is provided by the firmware of the electronic device or for invoking a voice call dialing functionality. Interface controls provided by the interface and applications pack that invoke functions provided by the electronic device itself, for example provided in firmware of the electronic device, may be referred to as encapsulated controls. Such encapsulation of controls by the interface and applications pack may promote a more complete adaptation of the communication experience.

The interface and applications pack further comprises an automatic self-installation routine that provides a user-friendly means to "stand up" the interface and applications pack for the electronic device. The self-installation routine may download applications, web widgets, ring tones, wallpapers, and other content to the electronic device. The self-installation routine may include instructions to automatically configure the device's home screens such as shortcuts, bookmarks, and widget placement. In an embodiment, a portion of the self-installation routine may execute partly in the network to provision and/or initialize network services, ringback tones, and other network-provided functionality associated with the interface and applications pack. For example, a portion of the self-installation routine may initialize and/or provision voice-mail changes. The portion of the self-installation routine that executes on the electronic device may invoke the portion of the self-installation routine that executes in the network. In an embodiment, a portion of the self-installation routine may be provided by a utility built into the basic firmware or software library of the electronic device and another portion of the self-installation routine may be provided as part of the specific interface and applications pack.

The interface and applications pack is experienced, at one level of abstraction, as a unity. For example, when a user selects an ID pack for installation on the electronic device, the user may perform a single selection action, and the self-installation routine may perform a number of separate and distinct actions to stand-up the selected ID pack that are not observed by the user. When the user selects an ID pack to be active, a currently active ID pack may be deactivated and the various distinct components of the selected ID pack may be brought into operation as a single global action, mediated by the automatic self-installation routine. The unity of experience may be further promoted by interactions among the several components of the ID pack. For example, selection of controls in a web widget of the ID pack may invoke playback of audios stored in media files of the ID pack; for example, execution of an application of the ID pack may trigger a modification of the wallpaper presented as a backdrop for the display of the electronic device.

An interface and applications pack may be tested to assure that the aggregation of media files, applications, web widgets, and network services interact appropriately with each other and do not impair other functionality of the electronic device. The testing may verify that the interface and applications pack interoperates with a range of different electronic devices, standard firmware, and/or standard applications. In an embodiment, the service provider may impose a constraint that interface and applications packs be provided to the electronic device from a controlled content source so that the service provider can exercise oversight and quality control of interface and applications packs. For further details about interface and applications packs, see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

In an embodiment, an interface and applications pack may comprise instructions configured to direct the presentation of interactive thumbnail images 150 on the mobile communication device 102, wherein the interactive thumbnail images 150 may be linked to stub applications 112 corresponding to full applications. In some cases, the interface and applications pack may comprise the interactive thumbnail images 150 to be presented and/or the stub applications 112 to which they are linked. In some contexts, presenting the interactive thumbnail images 150 may be considered to be substantially similar to displaying the interactive thumbnail images 150.

In an embodiment, an interface and applications pack may be activated on the mobile communication device 102. A plurality of interactive thumbnail images 150 comprising file names that match file names of full applications and/or a plurality of stub applications 112 comprising outdated version numbers and file names that match the file names of the interactive thumbnail images 150 may be downloaded in response to activating the interface and applications pack. The interactive thumbnail images 150 and/or the stub applications 112 may be downloaded in the form of a .ZIP file. In some cases, different stub applications 112 and/or interactive thumbnail images 150 may be downloaded in response to different interface and applications packs being activated. For example, the stub applications 112 and/or the interactive thumbnail images 150 downloaded in response to activation of a first interface application pack may be different from the stub applications 112 and/or the interactive thumbnail images 150 downloaded in response to activation of a second interface application pack, wherein the second interface application pack is different from the first.

The interactive thumbnail images 150 that are downloaded in response to activating the interface and applications pack may be placed within the virtual installation widget 104. The virtual installation widget 104 may provide each of the interactive thumbnail images 150 with a link to a location on the mobile communication device 102. The stub applications 112 downloaded in response to activating the interface and applications pack may be installed in a location on the mobile communication device 102 such that each stub application 112 is linked to the interactive thumbnail image 150 to which its file name corresponds. In an embodiment, the installed stub applications 112 may be updated to corresponding full applications as described in greater detail herein below.

In an embodiment, the virtual installation widget 104 may provide the stub applications 112 with a link to the application repository 120. A user of the mobile communication device 102 may select one of the stub applications 112 presented in the frame 140 of the virtual installation widget 104 on the display 130 of the mobile communication device 102. In an embodiment, the display 130 may be a graphical user interface that provides a touch to select capability to a user of the mobile communication device 102. Selecting one of the stub applications 112 may comprise selecting the interactive thumbnail image 150 associated with the stub application 112 by clicking on the interactive thumbnail image 150, invoking a touch to select functionality to select the interactive thumbnail image 150, or another way of selecting the interactive thumbnail image 150.

In response to selecting the stub application 112, the mobile communication device 102 may attempt to run the stub application 112. During the attempt to run the stub application 112, it may be determined that the version of the stub application 112 is out of date. Determining that the version of the stub application 112 is out of date may comprise, comparing the version of the stub application 112 to one or more versions of the full application to which it corresponds. In an embodiment, the one or more versions of the full application to which the stub application 112 is compared may be stored in the application repository 120. The mobile communication device 102 may prompt the user with an option to update to a newer version of the full application represented by the stub application 112 in response to determining that the version of the stub application 112 is out of date.

In an embodiment, the mobile communication device 102 may be configured to perform periodic checks of the stub applications 112. The periodic checks may be performed on all of the stub applications 112 or on a set of the stub applications 112. For example, the periodic check may be performed on the set of stub applications 112 that appear in the frame 140 of the virtual installation widget 104. The periodic check may be performed upon activation, upon powering on the mobile communication device 102, upon selecting one of the stub applications 112, in response to user input, or after predetermined time intervals. The predetermined time intervals may be about an hour, about two hours, about six hours, about a day, about two days, about a week, about two weeks, about a month, about six months, about a year, or some other interval. During the periodic checks of the stub applications 112, the version numbers of the stub applications 112 may be compared to one or more versions of their corresponding full applications. If the stub applications 112 are found to have an outdated version number, then the user may be prompted to update to a newer version.

The prompt may be in the form of a dialogue box or in some other form. If the user declines to update, then the stub application 112 may remain in place and provide limited functionality to the user. In some cases, the stub application 112 may not provide any functionality. If the user provides instructions to perform the update, then the stub application 112 may be updated to and/or replaced by its corresponding full functionality full application. Alternatively, the mobile communication device may automatically update the stub application 112 to its corresponding full application in response to selecting the stub application 112. It is contemplated that one or more the stub applications 112 presented in the virtual installation widget 104 may be updated to their corresponding full application by the mobile communication device 102 after a predetermined time period or in response to a trigger received from the network 116. The predetermined time period may be about 1 day, about 1 week, about 1 month, about 3 months, about 6 months, about 9 months, about 1 year, about 2 years, or some other time period.

The stub application 112 may elicit the mobile communication device 102 to access the application repository 120 contained on the server 118 of the network 116 through the base transceiver station 114 in response to being selected and receiving update instructions. The mobile communication device 102 may download and install a full application corresponding to the selected stub application 112 in place of the application 112. In an embodiment, installing the full application may comprise updating the stub application 112 to the full application. The stub application 112 may be a limited functionality version of the full application as described hereinabove and may be updated to the full application without satisfying further permissions. Alternatively, the virtual installation widget 104 may elicit, in response to selection of an interactive thumbnail image 150 linked to one of the stub applications 112, retrieval and installation of a full application in place of the stub application 112.

Once the stub application 112 has been replaced by the full application, it may be replaced in the frame 140 by a different stub application 112 as described hereinabove. The full application updated from the stub application 112 may be relocated from the frame 140 to another location on the display 130 such as a home screen, desktop, or other location. Or, the full application updated from the stub application 112 may be relocated from the frame 140 to another location not on the display 130. Alternatively, the full application may remain displayed in the frame 140.

Figure 3:
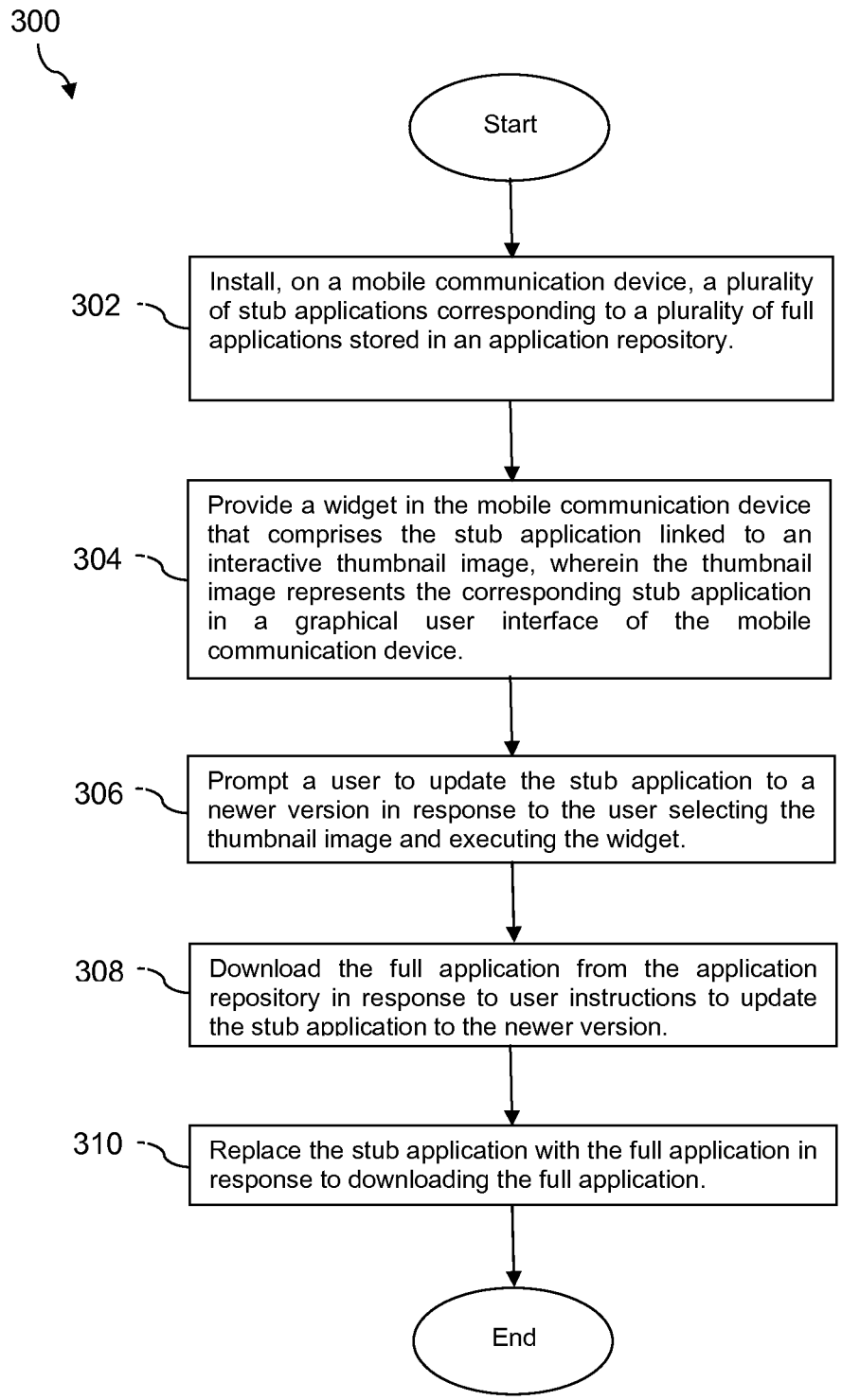
FIG. 3 is a flowchart of a method according to an embodiment of the disclosure.

Turning now to FIG. 3, a method 300 is described. In an embodiment, performing the method 300 may comprise the use of one or more of the mobile communication device 102, the plurality of stub applications 112, the application repository 120, the virtual installation widget 104, the interactive thumbnail images 150, the display 130, and/or other features described herein above with reference to FIG. 1 and FIG. 2.

At block 302, a plurality of stub applications that correspond to a plurality of full applications stored in an application repository may be installed on a mobile communication device. The installation may occur at the time of manufacture, or in some cases, at a later time such as during setup and connection to a network (e.g., upon purchase of the mobile communication device). In an embodiment, the stub applications may be limited functionality versions of full applications stored in the application repository in which permissions have been satisfied such that they may be updated to the full applications without satisfying further permissions. In some cases, being updated to the full applications may comprise satisfying update permissions rather than initial installation permissions. A widget may be provided in the mobile communication device at the time of manufacture in block 304. The widget may comprise the stub application linked to an interactive thumbnail image. In an embodiment, the interactive thumbnail image associated with the stub application may be displayed within a frame of the widget as described hereinabove with reference to FIG. 2. The thumbnail image may represent the full application corresponding to the stub application in a graphical user interface of the mobile communication device.

At block 306, a user may be prompted to update the stub application to a newer version in response to the user selecting the thumbnail image and executing the widget. Selecting the thumbnail image and executing the widget may elicit the mobile communication device to check the version of the stub application represented by the thumbnail image as discussed herein above with reference to FIG. 1 and FIG. 2. The version of the stub application may be found to be out of date, and the user may be prompted to update to a newer version. Prompting the user to update may comprise presenting a dialogue box containing update options to the user. The prompt to update to a newer version of the stub application may serve to entice the user to update the stub application to the full application as described hereinabove.

The full application may be downloaded from the application repository at block 308 in response to user instructions to update the stub application to the newer version. The stub application may be replaced with the full application at block 310 in response to downloading the full application. The updated full application that replaced the stub application may be removed from the widget and replaced with a different stub application as described hereinabove with reference to FIG. 2. Further, the replacement stub applications may be previously un-displayed stub applications obtained from a location in which stored stub applications are not displayed on a display of the mobile communication device.

Installing, at the time of manufacture, a plurality of limited functionality stub applications in which permissions have been satisfied such that they may be updated to corresponding full applications without satisfying further permissions may provide benefits to mobile communication device users and application providers while reducing negative effects associated with unused preinstalled applications. Application providers may benefit from increased consumer use of their applications, and mobile communication device users may benefit from convenient access to full applications through stub applications that may take up less memory and/or use less battery life than full applications. Unused, preinstalled stub applications that are not updated to full applications may present less of a drain on the mobile communication device's resources than would unused, preinstalled full applications which may make preinstalled stub applications preferable to preinstalled full applications for mobile communication device users.

Figure 4:
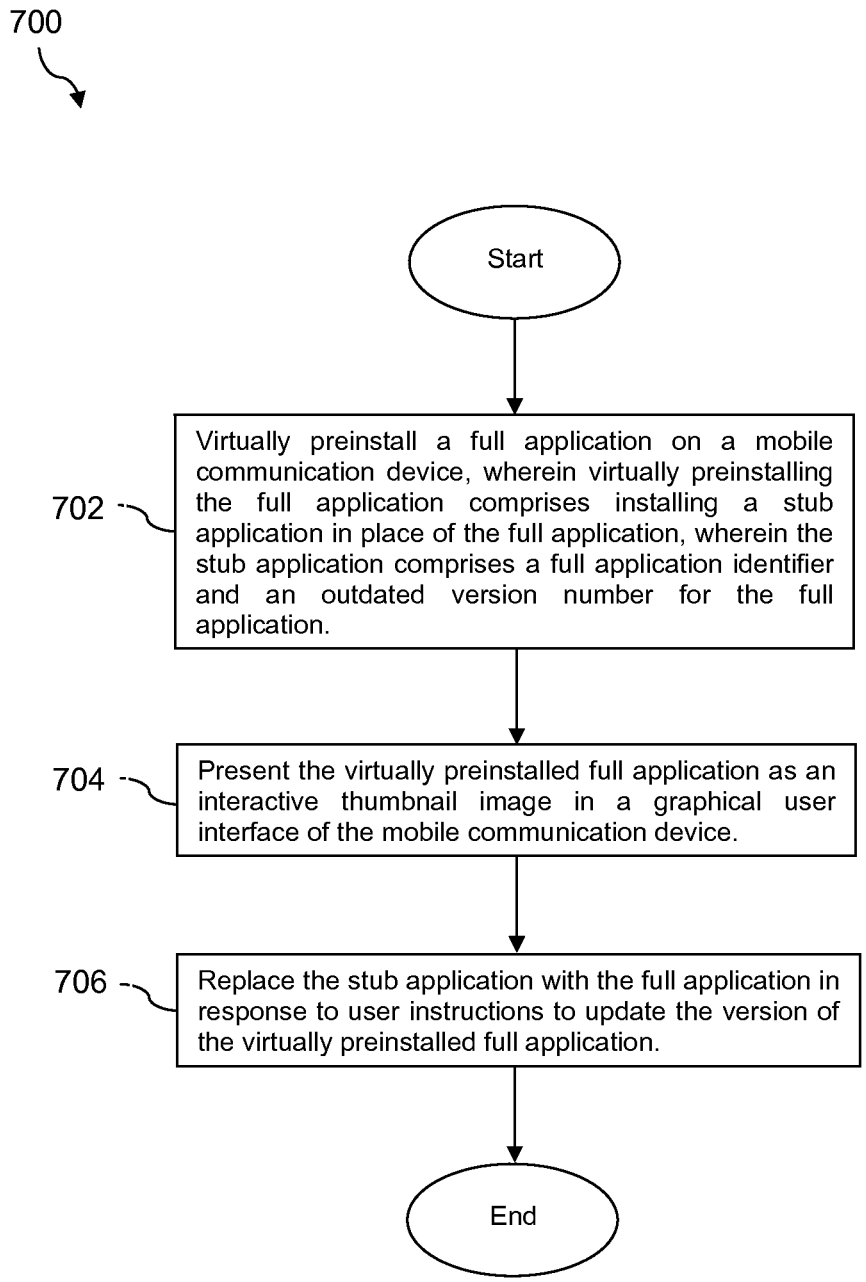
FIG. 4 is a flowchart of a method according to an embodiment of the disclosure.

Turning now to FIG. 4, a method 700 is described. In an embodiment, performing the method 700 may comprise the use of one or more of the mobile communication devices 102, the plurality of stub applications 112, the application repository 120, the virtual installation widget 104, the interactive thumbnail images 150, the display 130, and/or other features described herein above with reference to FIG. 1 and FIG. 2.

At block 702, a full application may be virtually preinstalled on a mobile communication device. In an embodiment, virtually preinstalling the full application may comprise installing a stub application in place of the full application, wherein the stub application comprises a full application identifier and an outdated version number for the full application. In an embodiment, the stub application may be installed in a widget frame displayed on a home screen of the mobile communication device and linked to a server. The server may comprise an application repository as described hereinabove.

The virtually preinstalled full application may be presented as an interactive thumbnail image in a graphical user interface of the mobile communication device at block 704. In an embodiment, the mobile communication device 102 may prompt a user to update the virtually preinstalled full application to a newer version in response to the user selecting the interactive thumbnail image. The stub application may be replaced at block 706 with the full application in response to user input to update the version of the virtually preinstalled full application. In an embodiment, replacing the stub application with the full application may comprise downloading the full application from an application repository as described hereinabove with reference to FIG. 2.

Virtually preinstalling full applications by installing stub applications in place of the full applications at the time of manufacture may provide benefits to mobile communication device users and application providers while reducing negative effects associated with unused, directly preinstalled applications. Application providers may benefit from increased consumer use of their applications, and mobile communication device users may benefit from convenient access to full applications through stub applications that may have lower overhead costs than full applications. Unused, virtually preinstalled full applications whose stub applications are not updated to full applications may present less of a drain on the mobile communication device's resources than would unused, directly preinstalled full applications which may make virtually preinstalled full applications preferable to directly preinstalled full applications for mobile communication device users.

Figure 5:
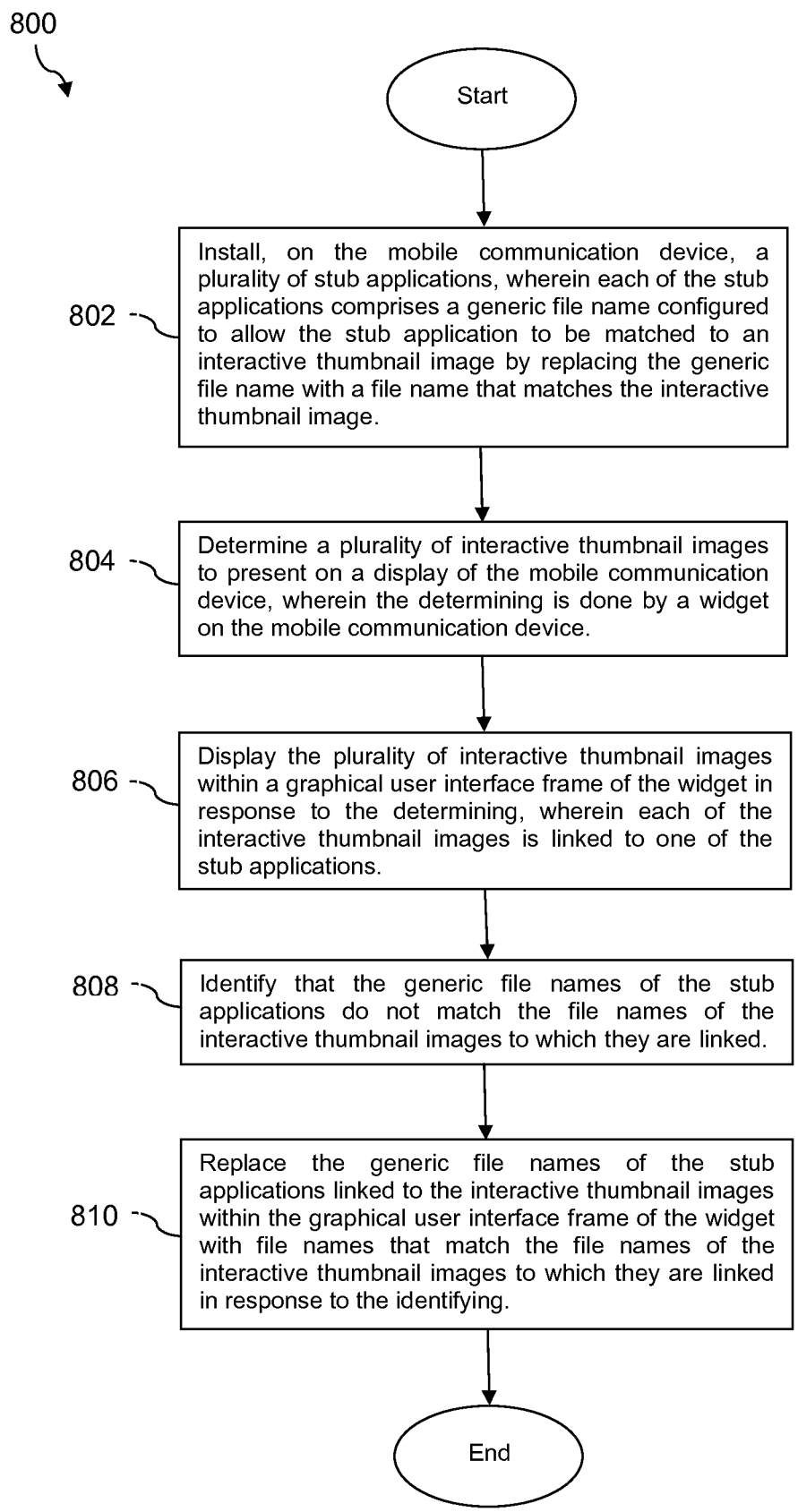
FIG. 5 is a flowchart of a method according to an embodiment of the disclosure.

Turning now to FIG. 5, a method 800 is described. In an embodiment, the method 800 may be implemented by the communication system 100 described hereinabove with reference to FIG. 2. At block 802, a plurality of stub applications may be installed on a mobile communication device, at least a portion of the stub applications comprises a generic file name. The generic file name may be configured to allow the stub application to be matched to an interactive thumbnail image by replacing the generic file name with a file name that matches the interactive thumbnail image. A plurality of interactive thumbnail images may be determined for presentation on a display of the mobile communication device at block 804, where the determining is done by a widget on the mobile communication device. The widget may determine the plurality of interactive thumbnail images to present based on information contained in an XML file or RSS feed as described hereinabove.

At block 806, the plurality of interactive thumbnail images may be displayed within a frame of the widget in response to the determining, wherein each of the interactive thumbnail images may be linked to one of the stub applications. The frame might be within a graphical user interface and may be referred to as a graphical user interface frame in some contexts. At block 808, it may be identified that one or more of the generic file names of the stub applications do not match the file names of the interactive thumbnail images to which they are linked. In an embodiment, the identifying may be done by a daemon application configured to compare the file names of interactive thumbnail images displayed on the mobile communication device with the file names of stub applications to which they are linked.

The generic file names of the stub applications linked to the interactive thumbnail images within the frame of the widget may be replaced at block 810 with file names that match the file names of the interactive thumbnail images to which they are linked in response to the identifying. In an embodiment, renaming the stub applications to match the file names of the interactive thumbnail images to which they are linked may comprise providing the stub applications with outdated version numbers of the file names of the interactive thumbnail images to which they are linked. After the stub applications have been renamed to match the file names of the interactive thumbnail images to which they are linked, they may be updated to full applications as described hereinabove.

Figure 6:
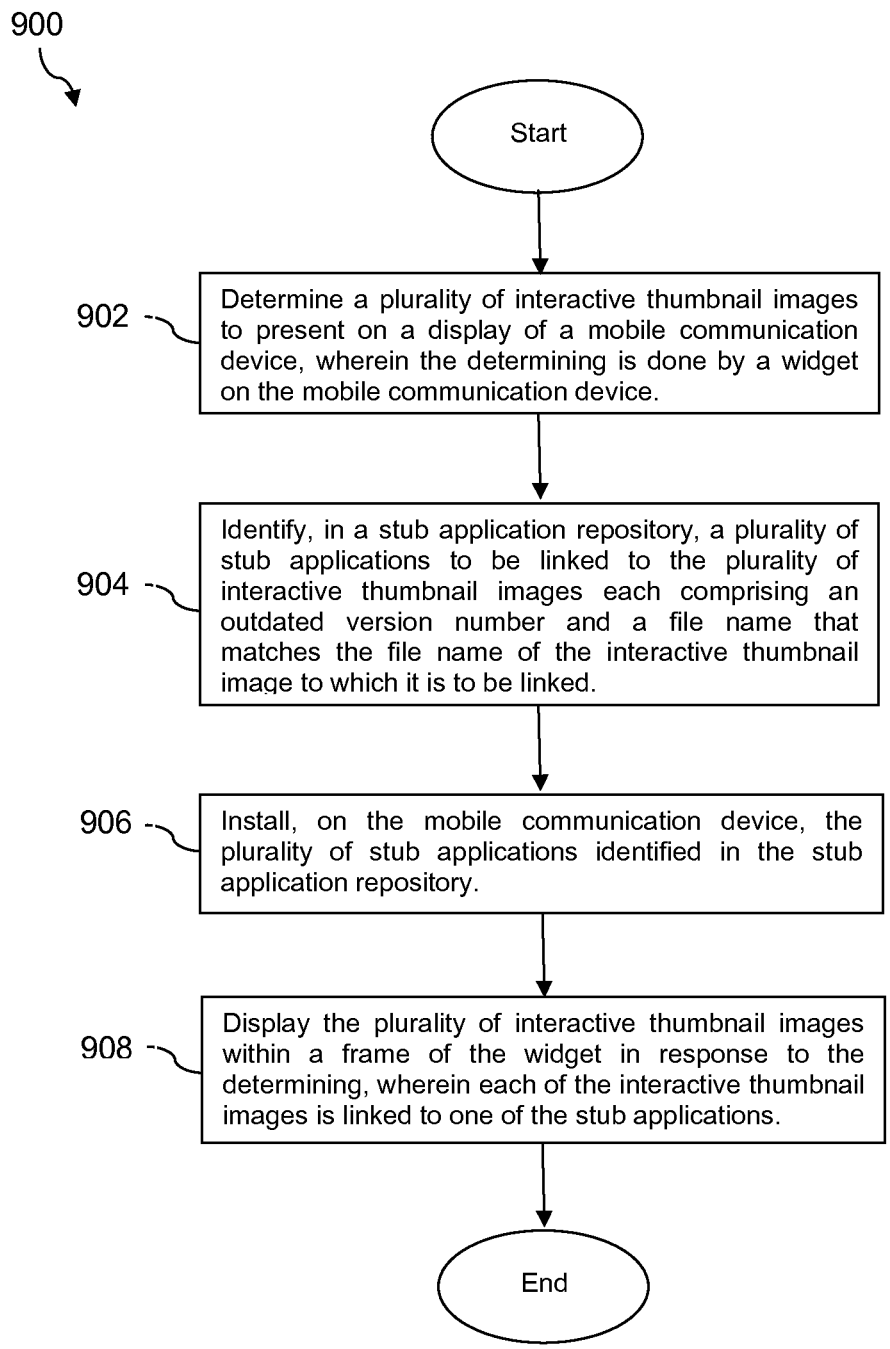
FIG. 6 is a flowchart of a method according to an embodiment of the disclosure.

Turning now to FIG. 6, a method 900 is described. In an embodiment, the method 900 may be implemented by the communication system 100 described hereinabove. At block 902, a plurality of interactive thumbnail images to present on a display of a mobile communication device may be determined, wherein the determining is done by a widget on the mobile communication device. In an embodiment, the widget may determine the plurality of interactive thumbnail images to present based upon reading an XML file or RSS feed as described hereinabove. A plurality of stub applications to be linked to the plurality of thumbnail images each comprising an outdated version number and a file name that matches the file name of the interactive thumbnail image to which it is to be linked may be identified in a stub application repository at block 904. In an embodiment, the stub application repository may be a service provider repository, wherein the service provider repository may be stored on a network.

The plurality of stub applications identified in the stub application repository may be installed on the mobile communication device at block 906. The plurality of interactive thumbnail images may be displayed within a frame of the widget at block 908 in response to the determining, wherein each of the interactive thumbnail images is linked to one of the stub applications. In an embodiment, each of the interactive thumbnail images may be linked to a different one of the stub applications. The stub applications linked to the displayed interactive thumbnail images may be updated to full applications as described hereinabove.

Figure 7:
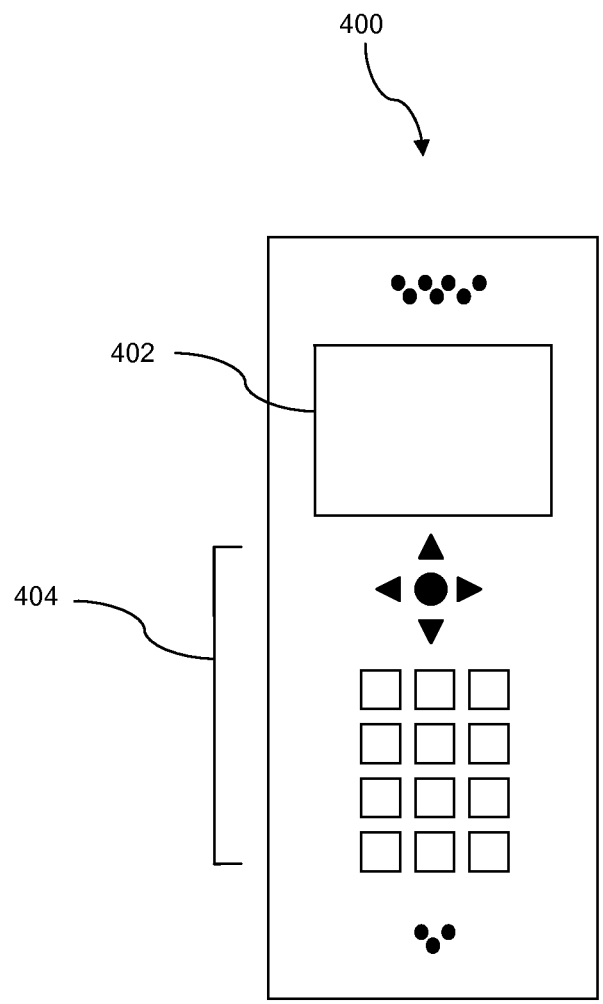
FIG. 7 is an illustration of a mobile device according to an embodiment of the disclosure.

FIG. 7 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 8:
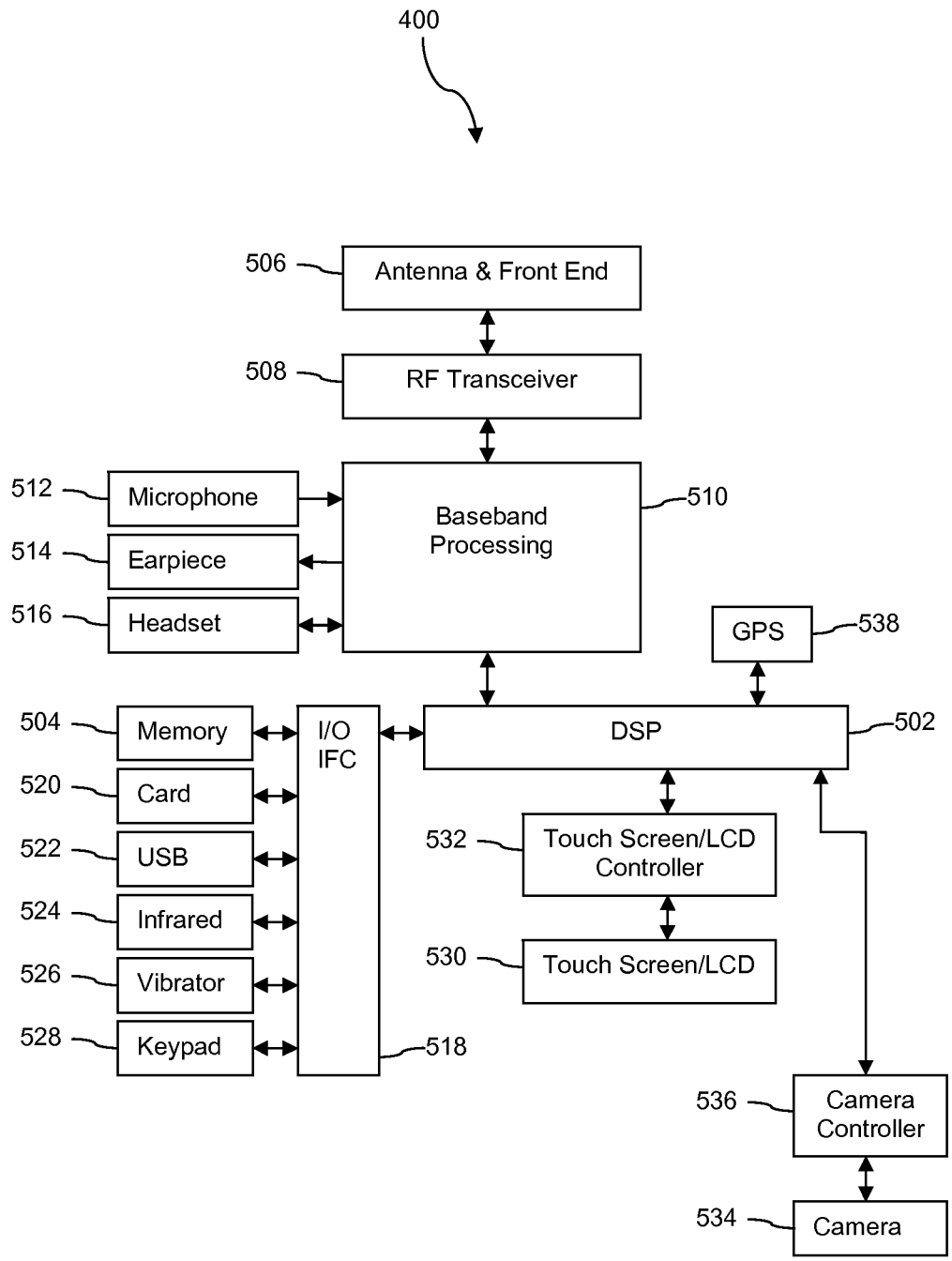
FIG. 8 is a block diagram of a hardware architecture of a mobile device according to an embodiment of the disclosure.

FIG. 8 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 9A:
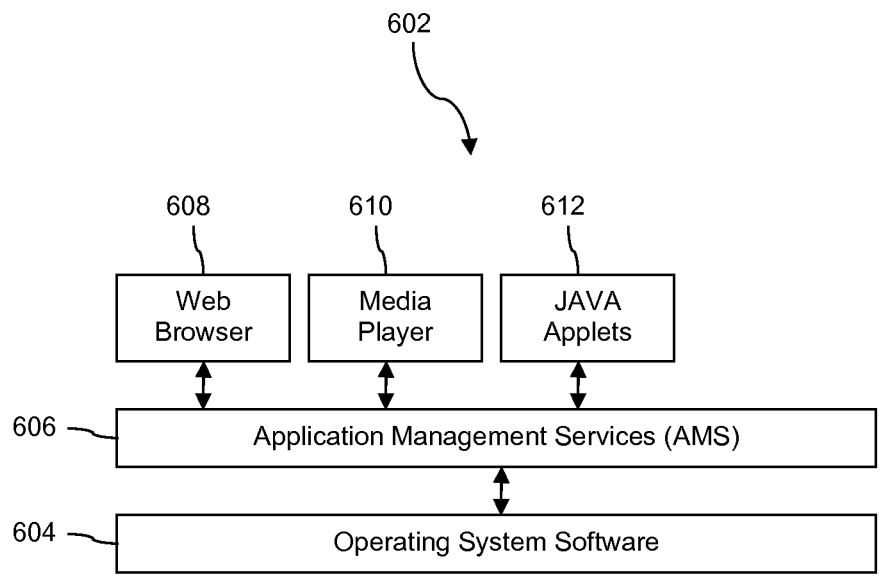
FIG. 9A is a block diagram of a software architecture of a mobile device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 9A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 9B:
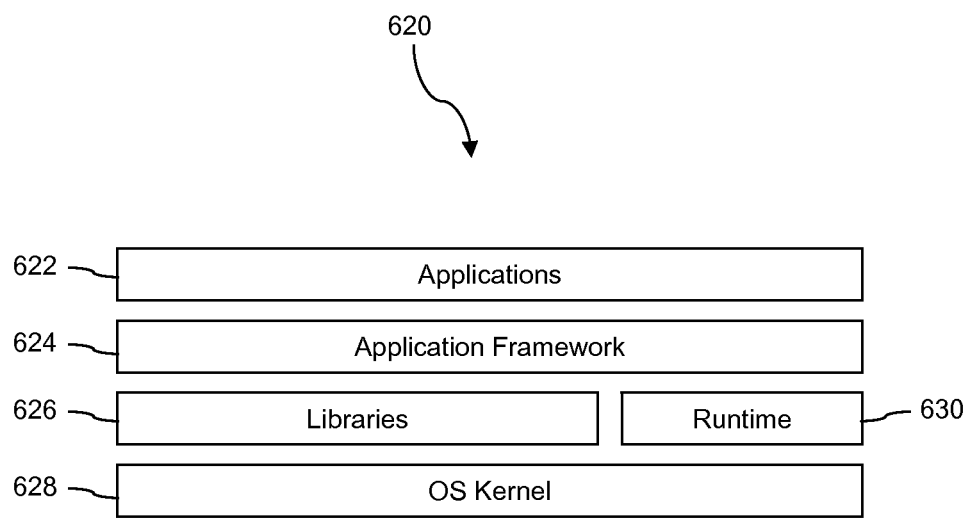
FIG. 9B is a block diagram of another software architecture of a mobile device according to an embodiment of the disclosure.

FIG. 9B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
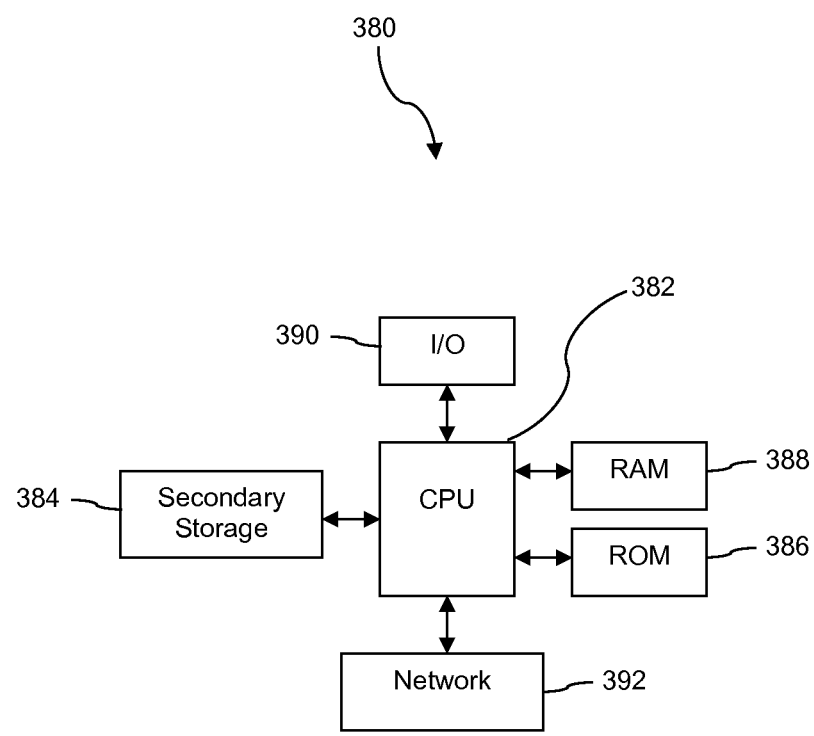
FIG. 10 illustrates an exemplary computer system suitable for implementing the several embodiments of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

In an embodiment, a method of installing stub applications on a mobile communication device is disclosed. The method may comprise activating an interface and applications pack on the mobile communication device and downloading a plurality of stub applications and a plurality of interactive thumbnail images in response to activating the interface and applications pack, wherein each of the stub applications comprises an outdated version number and a file name that matches the file name of one of the interactive thumbnail images. The method may further comprise locating the plurality of interactive thumbnail images within a widget of the mobile communication device, wherein the widget provides each of the interactive thumbnail images with a link to a location on the mobile communication device and installing the plurality of stub applications on the mobile communication device such that each stub application is linked to the interactive thumbnail image to which its file name matches. It is contemplated that the method may further comprise prompting a user to update a first stub application to a newer version in response to the user selecting a first interactive thumbnail image linked to the first stub application, downloading a full application from an application repository in response to user instructions to update the first stub application to the newer version, and replacing the first stub application with the full application in response to downloading the full application.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamic updating and renaming generic stub applications on a mobile communication device, comprising:

installing, on the mobile communication device, a plurality of generic stub applications, wherein at installation the plurality of generic stub applications are not yet associated with any application or their functionality, and wherein each of the plurality of generic stub applications comprises a generic file name configured to allow the generic stub application to be matched to an interactive thumbnail image by replacing the generic file name with a file name that matches the interactive thumbnail image;

determining, by a widget that configures a processor of the mobile communication device upon execution, a plurality of interactive thumbnail images to present on a display of the mobile communication device, wherein each of the plurality of interactive thumbnail images are updateable to represent one of the plurality of generic stub applications and are not initially linked to any of the plurality of generic stub applications;

based on the generic file name of each generic stub application, linking one of the plurality of interactive thumbnail images to one of the plurality of generic stub applications that is available;

displaying the plurality of interactive thumbnail images within a graphical user interface frame of the widget in response to the determining, wherein displaying each of the plurality of interactive thumbnail images presents the linked generic stub application as a virtual representation of a full application via the interactive thumbnail image;

identifying that the generic file names of the plurality of generic stub applications do not match the file names of the plurality of interactive thumbnail images to which they are linked; and responsive to the identifying, replacing the generic file names of the plurality of generic stub applications linked to the plurality of interactive thumbnail images within the graphical user interface frame of the widget with file names that match the file names of the plurality of interactive thumbnail images to which they are linked and correlate to full applications that the plurality of interactive thumbnail images represents.

2. The method of claim 1, further comprising:

receiving user input on the mobile communication device to receive a first full application that replaces a first generic stub application in response to the user selecting a first interactive thumbnail image linked to the first generic stub application;

downloading, to the mobile communication device, the first full application from an application repository based on the received user input; and replacing the first generic stub application with the first full application in response to downloading the first full application.

3. The method of claim 1, wherein at least a subset of the plurality of generic stub applications are installed at the time of manufacture.

4. The method of claim 1, wherein the widget reads at least one of an Extensible Markup Language (XML) file and a Rich Site Summary (RSS) feed to determine the plurality of interactive thumbnail images to present on the display of the mobile communication device.

5. The method of claim 1, wherein the identifying is done by a daemon application configured to compare the file names of the plurality of interactive thumbnail images in the frame of the widget with the file names of the plurality of generic stub applications to which they are linked.

6. The method of claim 1, wherein each of the plurality of generic stub applications comprises functionality that is independent from the functionality of the full application, the full application being capable of at least limited functionality for a user responsive to the full application being installed on the mobile device, and wherein the virtual representation presents the generic stub application via the interactive thumbnail image without the generic stub application providing the at least limited functionality of each of the plurality of the full applications.

7. A mobile communication device, comprising:

a display;

a processor;

a non-transitory memory;

a plurality of generic stub applications stored in the non-transitory memory, wherein at installation the plurality of generic stub applications are not yet associated with any application or their functionality, and wherein each of the plurality of generic stub applications comprises a generic file name;

a widget stored in the non-transitory memory that, when executed by the processor, configures the processor to:

determine a plurality of interactive thumbnail images to present on the display, wherein each of the plurality of interactive thumbnail images are updateable to represent one of the plurality of generic stub applications and are not initially linked to any of the plurality of generic stub applications, link one of the plurality of interactive thumbnail images to one of the plurality of generic stub applications that is available, and present, on the display of the mobile communication device, the plurality of interactive thumbnail images, each of which is linked to one of the plurality of generic stub applications, wherein presentation of the plurality of interactive thumbnail images virtually represents the plurality of generic stub applications as full applications; and a daemon application that, when executed by the processor, configures the processor to:

compare file names of the plurality of interactive thumbnail images with the generic file names of the plurality of generic stub applications to which they are linked, and rename generic stub applications that comprise generic file names that do not match the file names of the corresponding interactive thumbnail images to which they are linked with file names that match the file names of the corresponding thumbnail images to which they are linked and correlate to full applications that the corresponding interactive thumbnail images represent.

8. The mobile communication device of claim 7, wherein the plurality of interactive thumbnail images are presented within a frame of the widget on the display.

9. The mobile communication device of claim 8, wherein the widget provides the plurality of interactive thumbnail images that are linked to the plurality of generic stub applications subsequent to installation of the plurality of generic stub applications.

10. The mobile communication device of claim 7, wherein the plurality of interactive thumbnail images presented on the display of the mobile communication device comprises at least two interactive thumbnail images.

11. The mobile communication device of claim 7, wherein the plurality of interactive thumbnail images are presented based on the widget reading at least one of an Extensible Markup Language (XML) file and a Rich Site Summary (RSS) feed.

12. The mobile communication device of claim 7, wherein the widget further configures the processor to:

elicit, in response to a received selection of a first interactive thumbnail image linked to a first generic stub application, retrieval and installation of a first full application in place of the first generic stub application.

13. The method of claim 7, wherein each of the plurality of generic stub applications comprises functionality that is independent from the functionality of the full applications, the full applications being capable of at least limited functionality for a user responsive to the full applications being installed on the mobile device, and wherein the virtual representation presents the plurality of generic stub applications via the plurality of interactive thumbnail image without the plurality of generic stub applications providing the at least limited functionality of the full applications.

14. A method of dynamic updating and renaming generic stub applications on a mobile communication device, comprising:

determining, by a widget that configures a processor of the mobile communication device upon execution, a plurality of interactive thumbnail images to present on a display of the mobile communication device, wherein each of the plurality of interactive thumbnail images are updateable to represent one of a plurality of generic stub applications and are not initially linked to any of the plurality of generic stub applications;

identifying, in a generic stub application repository, the plurality of generic stub applications to be linked to the plurality of interactive thumbnail images, wherein at installation the plurality of generic stub applications are not yet associated with any application or their functionality, and wherein each of the plurality of generic stub applications comprises an updateable version number and a generic file name that is configurable to match a file name of the interactive thumbnail image to which the corresponding generic stub application is to be linked and correlate to a full application that the interactive thumbnail image represents;

installing, on the mobile communication device, the plurality of generic stub applications identified in the generic stub application repository;

linking, by the widget, one of the plurality of interactive thumbnail images to one of the plurality of generic stub applications that is available;

displaying the plurality of interactive thumbnail images within a frame of the widget in response to the determining, wherein each of the plurality of interactive thumbnail images is linked to one of the plurality of generic stub applications and presents the plurality of generic stub applications as a virtual representation of full applications; and replacing, by the widget, the generic file names of the plurality of generic stub applications linked to the plurality of interactive thumbnail images with file names that match the file names of the plurality of interactive thumbnail images to which they are linked.

15. The method of claim 14, further comprising:

receiving user input on the mobile communication device to receive a first full application that replaces a first generic stub application in response to the user selecting a first interactive thumbnail image linked to the first generic stub application;

downloading, to the mobile communication device, the first full application from an application repository based on the received user input and the updateable version number; and replacing the first generic stub application with the first full application in response to downloading the first full application.

16. The method of claim 14, wherein the generic stub application repository is stored on a network.

17. The method of claim 16, wherein the generic stub application repository is a service provider repository.

18. The method of claim 14, wherein the widget reads at least one of an Extensible Markup Language (XML) file and a Rich Site Summary (RSS) feed to determine the plurality of interactive thumbnail images to present.

19. The method of claim 14, wherein the identifying is done by a daemon application configured to compare the file names of the plurality of interactive thumbnail images in the frame of the widget with the file names of the plurality of generic stub applications to which they are linked.

20. The method of claim 14, wherein each of the plurality of generic stub applications comprises functionality that is independent from the functionality of the full application, the full application being capable of at least limited functionality for a user responsive to the full application being installed on the mobile device, and wherein the virtual representation presents the generic stub application via the interactive thumbnail image without the generic stub application providing the at least limited functionality of each of the plurality of the full applications.

* * * * *